United States Patent
Medina et al.

(10) Patent No.: US 10,601,541 B2
(45) Date of Patent: Mar. 24, 2020

(54) SCALING CONTENT COMMUNICATED OVER A NETWORK

(71) Applicant: AT&T Intellectual Property I, L.P., Atlanta, GA (US)

(72) Inventors: Douglas Medina, Grain Valley, MO (US); Frank Coppa, Kansas City, MO (US); Robert Johnston, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 53 days.

(21) Appl. No.: 15/971,984

(22) Filed: May 4, 2018

(65) Prior Publication Data
US 2018/0254850 A1   Sep. 6, 2018

Related U.S. Application Data

(63) Continuation of application No. 15/428,903, filed on Feb. 9, 2017, now Pat. No. 9,991,987, which is a (Continued)

(51) Int. Cl.
*H04L 1/00* (2006.01)
*H04L 12/24* (2006.01)
(Continued)

(52) U.S. Cl.
CPC .......... *H04L 1/0003* (2013.01); *H04L 1/0002* (2013.01); *H04L 1/0009* (2013.01); *H04L 1/0014* (2013.01); *H04L 1/0076* (2013.01); *H04L 41/0604* (2013.01); *H04L 41/0672* (2013.01); *H04L 41/5025* (2013.01);
(Continued)

(58) Field of Classification Search
CPC ... H04L 65/605; H04L 1/0002; H04L 1/0003; H04L 1/0009; H04L 1/0014; H04L 1/0076
See application file for complete search history.

(56) References Cited

U.S. PATENT DOCUMENTS 6,137,539 A   10/2000   Lownes et al.
6,184,935 B1   2/2001   Iaquinto et al.
(Continued)

OTHER PUBLICATIONS

Office Action dated Aug. 16, 2012 for U.S. Appl. No. 12/823,202, 16 pages.
(Continued)

*Primary Examiner* — Jung H Park
(74) *Attorney, Agent, or Firm* — Amin, Turocy & Watson, LLP

(57) ABSTRACT

An architecture is provided that can scale content resolution in order to mitigate errors in a provisioned service of a communication network, such as a wireless service or a femtocell service that integrates with DSL or other broadband carriers. The architecture can identify fault conditions relating to e.g., bandwidth oversubscription or symbolization integrity. Based upon such identification, the architecture can alter encoding format codecs of certain types of content in order to reduce their resolution/quality, thereby mitigating bandwidth oversubscription fault conditions or freeing up space (without necessarily increasing bandwidth) to insert additional FEC code.

20 Claims, 12 Drawing Sheets

Related U.S. Application Data continuation of application No. 14/938,168, filed on Nov. 11, 2015, now Pat. No. 9,609,038, which is a continuation of application No. 13/768,096, filed on Feb. 15, 2013, now Pat. No. 9,215,132, which is a continuation of application No. 12/823,202, filed on Jun. 25, 2010, now Pat. No. 8,406,134.

(51) Int. Cl.
*H04L 12/26* (2006.01)
*H04L 12/801* (2013.01)
*H04L 12/811* (2013.01)
*H04L 29/06* (2006.01)

(52) U.S. Cl.
CPC .......... *H04L 43/0823* (2013.01); *H04L 43/16* (2013.01); *H04L 47/11* (2013.01); *H04L 47/38* (2013.01); *H04L 65/605* (2013.01); *H04L 41/0681* (2013.01)

(56) References Cited

U.S. PATENT DOCUMENTS

| | | |
|---|---|---|
| 6,490,705 B1 | 12/2002 | Boyce |
| 7,397,400 B2 | 7/2008 | Miller |
| 2005/0163211 A1 | 7/2005 | Shanableh |
| 2005/0195815 A1 | 9/2005 | Chaudhuri |
| 2006/0109901 A1 | 5/2006 | Ye et al. |
| 2006/0133355 A1 | 6/2006 | Anschutz |
| 2006/0156198 A1 | 7/2006 | Boyce et al. |
| 2006/0233252 A1 | 10/2006 | Bhattacharya et al. |
| 2008/0002580 A1 | 1/2008 | Kawada et al. |
| 2008/0172593 A1 | 7/2008 | Rainish et al. |
| 2008/0192119 A1 | 8/2008 | Li et al. |
| 2009/0135918 A1* | 5/2009 | Mak-Fan ......... H04N 21/41407 375/240.28 |
| 2010/0080287 A1 | 4/2010 | Ali |
| 2010/0142524 A1 | 6/2010 | Garofalo et al. |
| 2011/0013692 A1 | 1/2011 | Cohen et al. |

OTHER PUBLICATIONS

Advanced Television Systems Committee, ATSC Recommended Practice: E-VSB Implementation Guidelines, Apr. 18, 2006, Washington, DC 2006.

Office Action dated Mar. 16, 2015 for U.S. Appl. No. 13/768,096, 18 pages.

Office Action dated Jul. 21, 2016 for U.S. Appl. No. 14/938,168, 22 pages.

Office Action dated Oct. 3, 2017 for U.S. Appl. No. 15/428,903, 21 pages.

* cited by examiner

SCALING CONTENT COMMUNICATED OVER A NETWORK

CROSS-REFERENCE TO RELATED APPLICATIONS

This application is a continuation of, and claims priority to each of, U.S. patent application Ser. No. 15/428,903 (now U.S. Pat. No. 9,991,987), filed on Feb. 9, 2017, entitled "SCALING CONTENT COMMUNICATED OVER A NETWORK," which is a continuation of U.S. patent application Ser. No. 14/938,168 (now U.S. Pat. No. 9,609,038), filed on Nov. 11, 2015, entitled "SCALING CONTENT COMMUNICATED OVER A NETWORK," which is a continuation of U.S. patent application Ser. No. 13/768,096 (now U.S. Pat. No. 9,215,132), filed on Feb. 15, 2013, entitled "SCALING CONTENT COMMUNICATED OVER A NETWORK," which is a continuation of U.S. patent application Ser. No. 12/823,202 (now U.S. Pat. No. 8,406,134), filed on Jun. 25, 2010, entitled "SCALING CONTENT COMMUNICATED OVER A NETWORK." The entireties of the above noted applications are incorporated herein by reference.

BACKGROUND

With advances in computational power continually increasing for handheld devices or other mobile devices, new applications are eventually expected to arise that can further stress the various networks of conventional wireless communications systems as well as their femtocell/broadband counterpart. For example, handheld video phones that can support video calls/conferencing and/or video text messages might soon become a reality. However, voice data alone can be often observed to create a good deal of stress for conventional service providers, so the addition of video will only exacerbate the issue of handling voice data today. Moreover, integration with broadband infrastructure via, e.g., femtocells or home nodeB (HNB) devices can be affected as well, which already handle other network traffic relating to the underlying broadband (e.g., digital subscriber line (DSL)) service.

Accordingly, both current and future demand placed on communications network infrastructure can be improved, which can be useful to both network providers and service subscribers.

DETAILED DESCRIPTION

Figure 1:
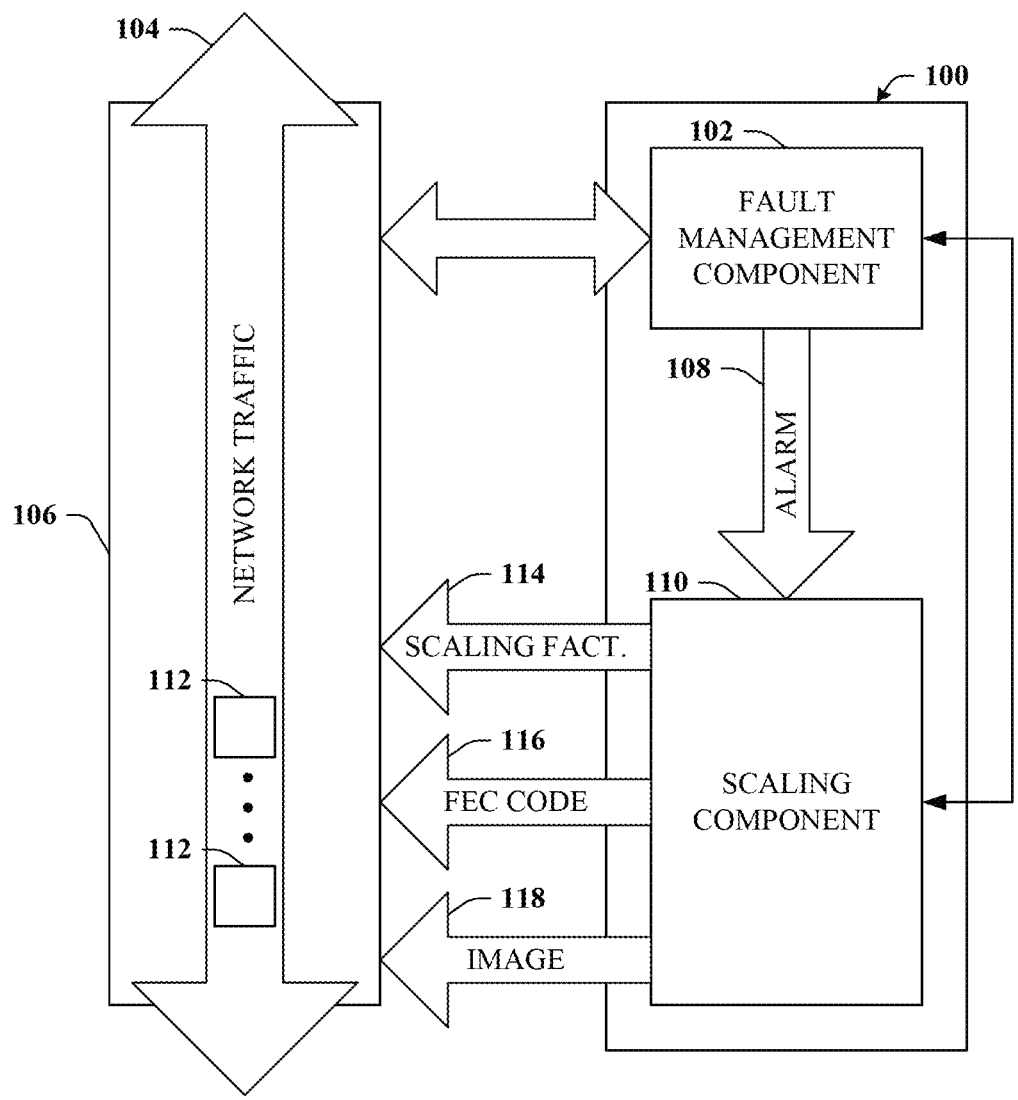
FIG. 1 is a block diagram of a system that can scale content resolution to mitigate errors in a provisioned service of a communication network.

The subject matter disclosed herein, in one aspect thereof, comprises an architecture that can scale content resolution to mitigate error conditions in a provisioned service of a communication network. In accordance therewith and to other related ends, the architecture can include a fault management component that can monitor network traffic through a gateway, and that can further issue an alarm based upon detection of a predetermined fault condition associated with a degradation of service. The degradation of service can relate to, e.g., bandwidth oversubscription, symbolization integrity (e.g., damaged bits or signals) or the like. Thus, the predetermined fault conditions can be associated with early detection of such indicators of service degradation.

In addition, the architecture can include a scaling component that can reduce a resolution (e.g., apply a codec of lesser bitrate, but typically of the same encoding format) associated with content communicated through the gateway. The resolution can be reduced by a scaling factor that can be determined based upon the type of the alarm issued by the fault management component or based upon other data included therein. By reducing the resolution of certain content transitioning the gateway, bandwidth oversubscription can be mitigated. Moreover, in the case of symbolization integrity, this additional bandwidth can be utilized to insert additional forward error correction (FEC) code, which can operate to alleviate logical errors without substantially increasing bandwidth in the process (e.g., FEC code added to content with reduced resolution can still require less bandwidth to propagate than the original resolution content).

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with reference initially to FIG. 1, system 100 that can scale content resolution to mitigate errors in a provisioned service of a communication network is depicted. Generally, system 100 can include fault management 102 that can monitor network traffic 104 through gateway 106. In addition, fault management component 102 can further issue alarm 108 based upon detection of a predetermined fault condition associated with a degradation of service (e.g., a degradation of network traffic 104 through gateway 106 or other network elements).

Furthermore, system 100 can also include scaling component 110 that can reduce a resolution associated with content 112 communicated through gateway 106 by scaling factor 114. Content 112 can represent all or a portion of network traffic 104 and will typically be some known type of encoded media content such as voice, video, images, or the like. Thus, by reducing the resolution at which content 112 will be presented (e.g., by a recipient device), file size, data streams, error rates, and/or bandwidth associated with the communication of such content 112 can be reduced as well. Put another way, the quality of presented content 112 can be sacrificed in order to mitigate various network errors, which is further described in connection with FIG. 3, infra. In addition, scaling factor 114 as well as a scaling order (e.g., the order in which and/or degree to which various types of media is scaled) can be based upon alarm 108 (e.g., the type or nature of alarm 108 or information included therein), which is also further detailed below.

As depicted, in one or more aspect, system 100 (or components included therein) can be operatively or communicatively coupled to gateway 106. However, in other implementations, it should be appreciated that all or certain portions of system 100 can be embedded or included in gateway 106. For example, an alternative implementation is presented with reference to FIG. 5, infra.

Figure 2:
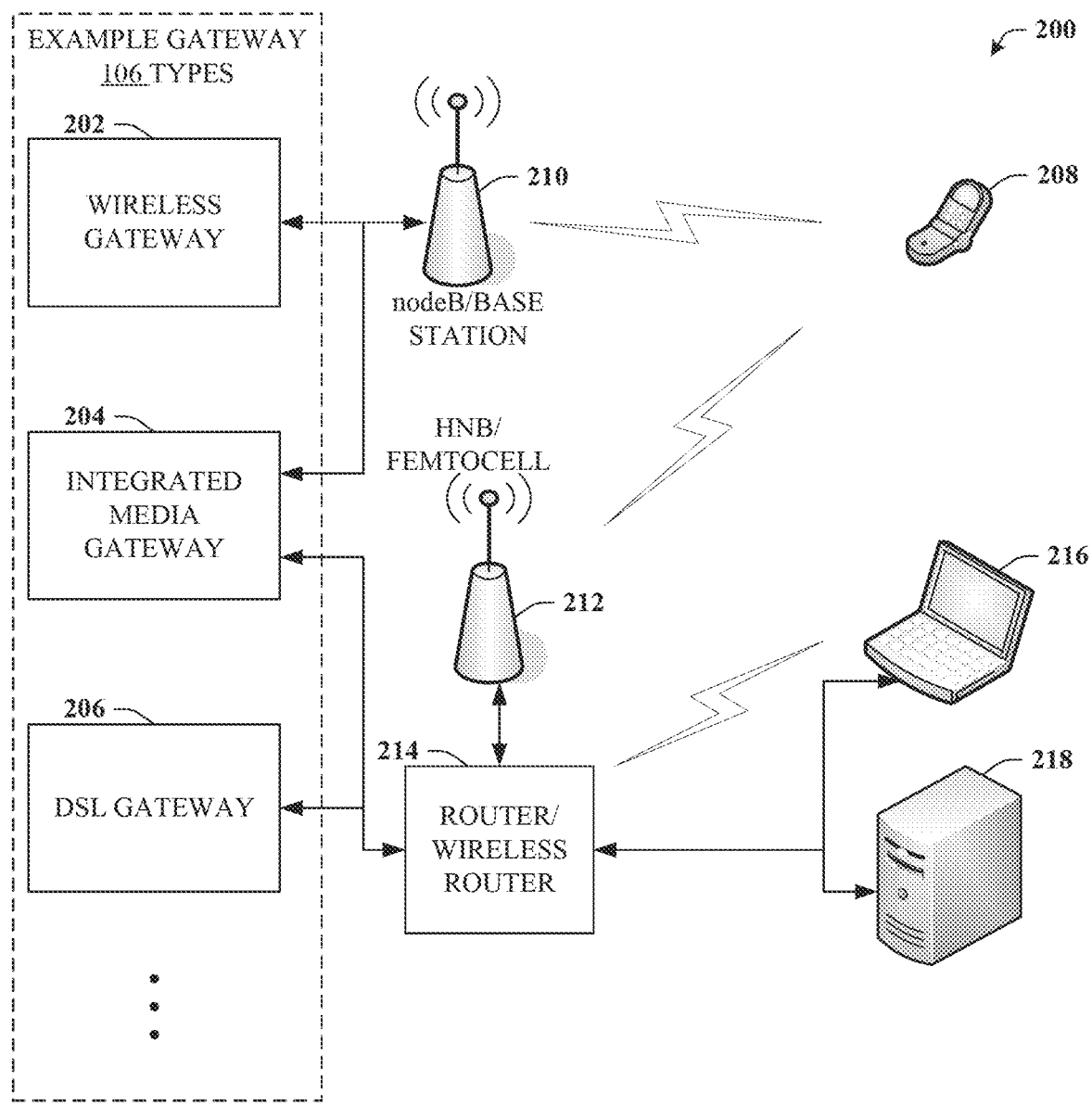
FIG. 2 depicts a block diagram of a system that illustrates various example gateway types for network communication.

In one or more aspect, gateway 106 can be at least one of a wireless gateway, a digital subscriber line (DSL) gateway, or an integrated media gateway, which is further discussed with reference to FIG. 2. While still referencing FIG. 1, but turning now as well to FIG. 2, system 200 that illustrates various example gateway types for network communication is provided. As introduced above, examples of gateway 106 can be, e.g., wireless gateway 202, integrated media gateway 204, DSL gateway 206 or the like. As depicted, mobile device 208, such as a cellular phone, personal digital assistant (PDA), tablet, etc. can communicate with either base station 210 (e.g., when roaming outdoors) or femtocell 212 (e.g., while indoors, such as a home, office, or other public or private site).

Network traffic 104 (e.g., including voice or video content 112) transmitted from mobile device 208 can be received by base station 210 and forwarded along to wireless gateway 202 before propagating further into an existing circuit switching network domain or the like. Likewise, network traffic 104 transmitted from mobile device 208 to femtocell 212 can be passed to router 214 (or another suitable component) on to DSL gateway 206 before propagating further into an existing Internet protocol (IP) multimedia subsystem (IMS) network domain. In one or more aspects, integrated media gateway 204 can support both time-division multiplexing (TDM) protocol signaling and IP signaling. Hence, integrated media gateway 204 can potentially handle network traffic 104 to/from base station 210 or femtocell 212.

As another example, network traffic 104 can originate from wireless device 216 (e.g., a laptop, game console, or other appliance or device) or wired device 218 (e.g., a personal computer, television, set top, media player, or other appliance or device). As depicted, both wireless device 216 and wired device 218 can be physically connected to router 214 (e.g., physical ethernet, cable, serial lines . . . ), while wireless device 216 can also communicate with wireless router 214 by way of WI-FI or another wireless protocol.

Regardless of the source or destination of network traffic 104, upon entering (or just prior to entering) gateway 106, whether implemented as wireless gateway 202, integrated media gateway 204, DSL gateway 206 or another suitable type of gateway 106, network traffic 104 can be monitored, and content 112 included therein potentially modified, as detailed herein.

Figure 3:
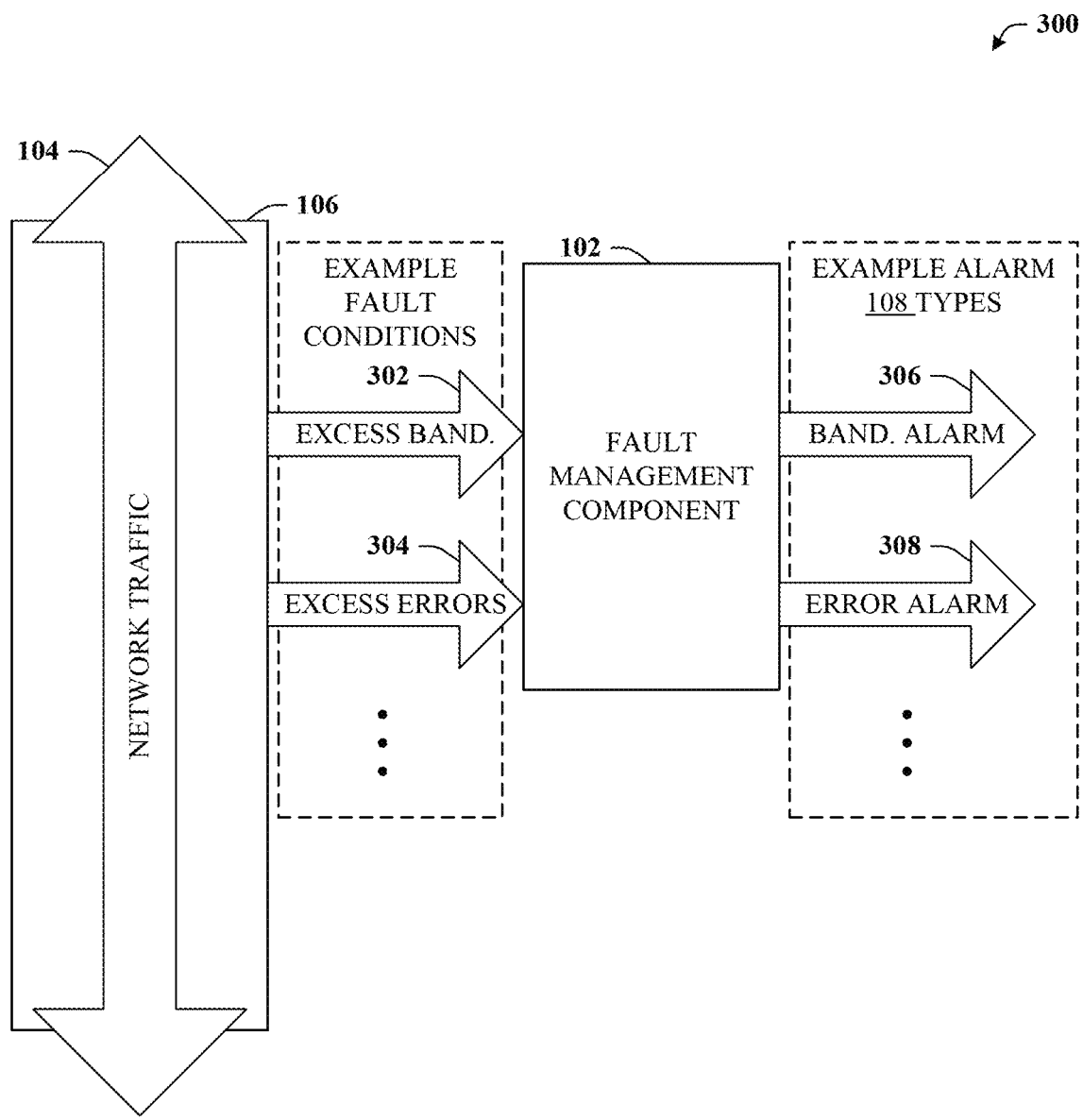
FIG. 3 illustrates a block diagram of a system that can generate various types of alarms in connection with service degradation.

Still referring to FIG. 1, but turning now also to FIG. 3, system 300 that can generate various types of alarms in connection with service degradation is illustrated. System 300 can include fault management 102, which as detailed supra, can monitor network traffic 104 through gateway 106, and that can further issue alarm 108 based upon detection of a predetermined fault condition associated with a degradation of service. It should then be appreciated that various types of fault conditions can arise that can potentially deprecate service. Consequently, detection of the various fault conditions as well as potential solutions can also vary. Accordingly, one or more types of alarm 108 can be constructed for each type of fault condition.

For instance, FIG. 3 provides two types of example fault conditions, one of excess bandwidth 304 and another of excess (logical) errors 304. Likewise, FIG. 3 also depicts two associated alarms, 306, and 308. However, it should be appreciated that the illustrated examples are intended to provide concrete illustrations, and are not necessarily intended as limitations. Thus, many other types of fault conditions can exist, and each fault condition can lead to more than one type of alarm 108 (e.g., different types of alarms for the same fault condition based upon severity of the fault condition, frequency of the fault condition, time of day, broader network or other resource utilization . . . ).

In one or more aspect, fault management component 102 can issue bandwidth alarm 306 based upon detection of a condition in which network traffic 104 through gateway 106 exceeds a predetermined maximum bandwidth allocation (e.g., excess bandwidth 302 fault condition). The predetermined maximum bandwidth allocation can be based upon physical limitations of network infrastructure or based upon a service provision, which is further discussed infra. Moreover, typically, the predetermined maximum bandwidth allocation will relate to upstream traffic, since the upstream typically represents networking bottlenecks, however, such need not always be the case. For example, if excess bandwidth 302 fault condition is detected on the downstream pipe, bandwidth alarm 306 can operate in various ways.

For example, consider the case in which the underlying communication network is providing a three-way video call between three subscribers, user A, user B, and user C, each operating a video-enabled mobile device 208. Suppose further that user A is also simultaneously surfing the web and/or texting while joining in on the video call. Consider now, three different scenarios. In the first case, fault management 102 detects excess bandwidth 302 on the upstream for user A. As a result, gateway 106 (e.g., wireless gateway 202 or integrated media gateway 204) can receive, either directly or indirectly, bandwidth alarm 306, which can facilitate various fault condition mitigation activities related to reducing resolution and further discussed herein. In the second case, fault management 102 detects excess bandwidth 302 on the downstream for user A. As a result, gateway 106 can receive bandwidth alarm 306 and suitable remedial measures taken in response.

However, now consider the third case, which is substantially identical to the second case. Yet, here, rather than delivering bandwidth alarm 306 only to gateway 106 associated with user A, bandwidth alarm 306 can be additionally or alternatively delivered to gateway(s) 106 associated with user B and/or user C. Obviously, some pitfalls or trade-offs exist for this third scenario. For example, such might only be considered when all three users employ the same carrier and/or service provider. Moreover, even though in this case user A is realizing a downstream bottleneck, users B and C might be capable of handling the current bandwidth constraints without issue. Thus, scaling content 112 can realize a lower resolution presented to all users, even though only user A requires the lower resolution to remain within bandwidth subscription measures. The trade-off of this approach, however, is that such can reduce overall network congestion by applying scaling closer to the source than to the destination that is exhibiting the potential fault condition.

Regardless, in one or more aspect, fault management 102 can issue error alarm 308 based upon detection of a fault condition in which network traffic 104 through gateway 106 includes logical errors in excess of a predetermined maximum error rate threshold (e.g., excess errors 304 fault condition). In other words, distinct from a fault condition due to bandwidth oversubscription, a different fault condition resulting from damaged bits can exist. However, in both cases degradation of service can occur if the underlying fault condition is not remedied. Moreover, these alarms 306, 308 can include various other information relating to network traffic 104 and/or content 112.

Continuing the discussion of FIG. 1, scaling component 110 can receive alarm 108 (which can be constructed as bandwidth alarm 306, error alarm 308, or other alarm types). As noted previously, scaling component 110 can apply (or transmit an instruction to apply) scaling factor 114 to content 112 based upon a type of alarm 108 received as well as other information included in alarm 108 and potentially further based upon information obtained or received elsewhere. As discussed, this scaling factor 114 can be employed to reduce a resolution of all or portions of content 112 included in network traffic 104. By reducing the resolution of content 112, the amount of (encoded) information describing a presentation of content 112 can be reduced. Accordingly, the presentation of content 112 will likely be of a lower quality, but the amount of bandwidth required to propagate content 112 through gateway 106 (as well as the remainder of the communications network) can be reduced as well.

Hence, in the case of a fault condition relating to excess bandwidth 302, a reduction in the caliber of content 112 (e.g., encoded media) can be a viable or desirable tradeoff. For instance, by lowering the bandwidth necessary to propagate content 112, the excess bandwidth 302 fault condition can be mitigated. Thus, lower quality of encoded media can be preferred over some type of network failure resulting in a dropped call, loss of service, or other potential issues deemed more severe than maintaining the original or a particular resolution during presentation (e.g., output of audio or video) of the underlying content 112.

On the other hand, in the case of a fault condition relating to excess errors 304, bandwidth through gateway 106 is not necessarily an issue. Rather, an ability to interpret the information included in content 112 can be endangered due to too many logical errors. In this case, scaling component 110 can further introduce forward error correction (FEC) code 116 into content 112 communicated through gateway 106. Thus, the savings with respect to bandwidth achieved by reducing the resolution of content 112 can be viewed as surplus that can be used for additional FEC code 116. Put another way, reducing the data size of content 112 allows FEC code 116 to be inserted into content 112 without increasing that size over its original dimensions. Thus, FEC code 116 can be inserted to without effecting bandwidth constraints.

In accordance with the above, it should therefore be appreciated that scaling component 110 can determine scaling factor 114 based upon a comparison of current network traffic with at least one of a predetermined maximum bandwidth allocation or a predetermined maximum error rate threshold. Put another way, a value of the scaling factor 114 can be based upon current network traffic as well as based upon other information included in alarm 108 or from other suitable sources.

As another example, scaling component 110 can determine scaling factor 114 further based upon a type of content 112 communicated through gateway 106. Typically, the type of content will relate to at least one of voice content or video content, but it should be appreciated that the type can relate to a protocol employed, or an encoding scheme employed or the like. Regardless, scaling component 110 can determine, e.g., to scale down video content, but leave voice content undisturbed, which is further discussed in connection with FIG. 4. Furthermore, as still another example, scaling component 110 can determine scaling factor 114 further based upon a service provision agreement or based upon preferences determined by a network carrier or subscriber, which along with additional description in connection with provision of image 118, is also further detailed with reference to FIG. 4.

Figure 4:
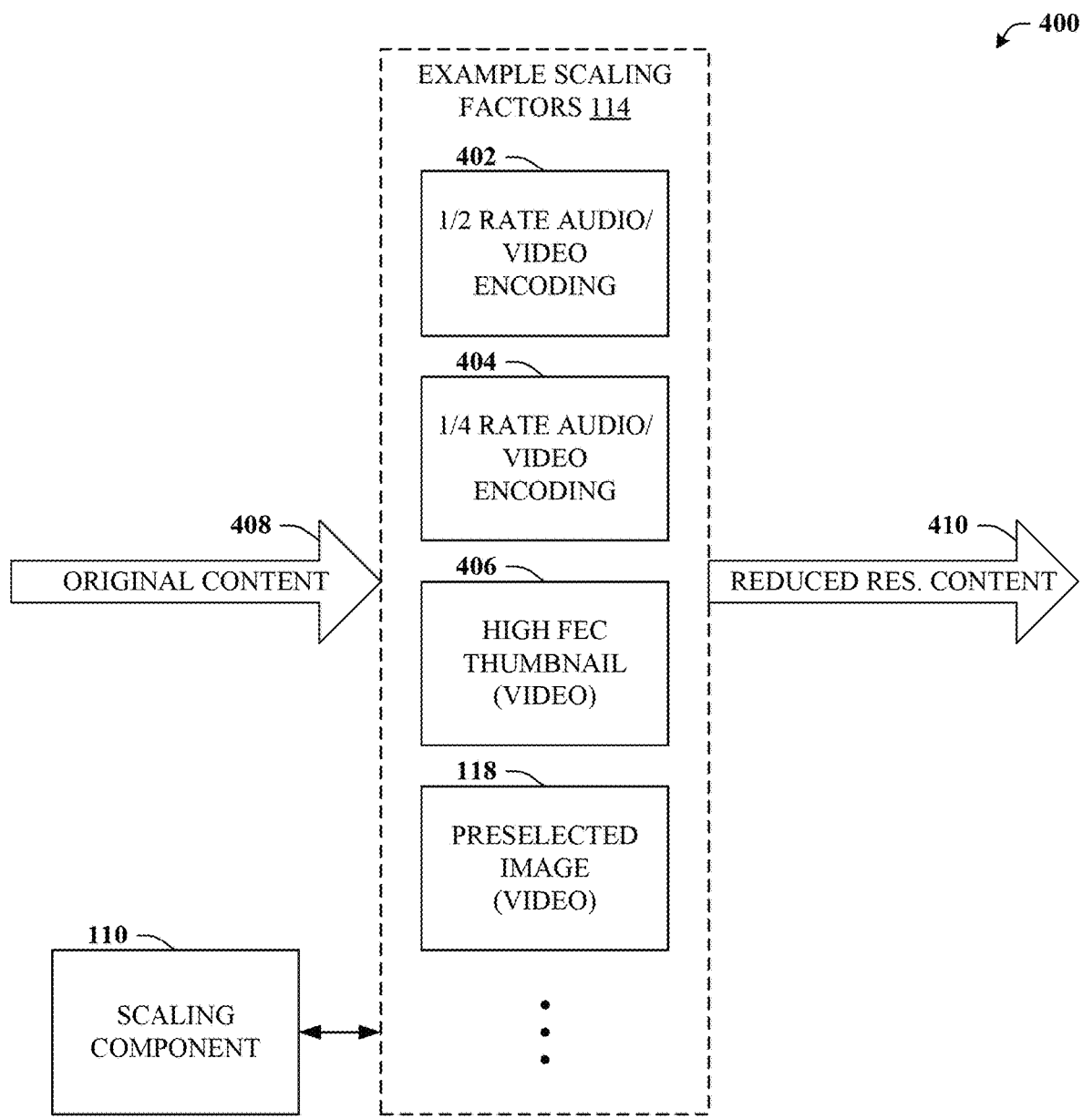
FIG. 4 is a block diagram of a system that facilitates a reduction in resolution of content based upon a variety of scaling factors.

While still reviewing FIG. 1, but referring now also to FIG. 4, system 400 that can facilitate a reduction in resolution of content based upon a variety of scaling factors is depicted. System 400 can include scaling component 110 as substantially described supra that can reduce content resolution according to one of several scaling factors 114. By way of example, but not necessarily limitation, scaling factor 114 can be half rate encoding 402, quarter rate encoding 404, high FEC thumbnail 406, a preselected still image 118, or similar. Typically, half rate encoding 402 and quarter rate encoding 404 can be applied to both voice and video content, and the encoding rate as well as the encoding format can be selected based upon the encoding format of original content 408. Thus, reduced resolution content 410 will often be of a lower resolution and will typically require less bandwidth to traverse network elements to whatever degree not offset by addition FEC code 116 (if any).

On the other hand, high FEC thumbnail 406 and preselected still image 118 will usually relate only to video content. For example, during times of prominent fault conditions, video content 112 can be reduced to high FEC thumbnail 406, which can mitigate both bandwidth and logical error fault conditions contemporaneously. In even more extreme conditions, video content 112 can be replaced with preselected still image 118 until the fault condition is alleviated. It should be appreciated that when scaling component 110 employs preselected still image 118 to represent video-based content (e.g., in the event the resolution is determined to be reduced below a particular threshold), preselected still image 118 need not necessarily relate to the underlying video-based content. Rather, preselected still image 118 can be, e.g., a profile picture of an associated user, an image indicative of the fault condition selected by the service provider or the user, or some other suitable graphic or visual indicia. However, in other instances, preselected still image 118 can be a low (or even high) resolution frame extracted from the video-based content, and can in some cases be updated periodically.

Given that various types of content (e.g., voice, video, . . . ) are envisioned to be suitable for scaling, scaling component 110 can, in one or more aspect, determine a scaling order for disparate types of content 112 communicated through gateway 106. For example, scaling component 110 can determine that voice content takes priority over video content so that all or portions or certain types of video content will be scaled before scaling any or certain portions of audio content. Additionally or alternatively, scaling component 110 can determine that certain types of content (e.g., video) should be scaled to a certain level (e.g., to quarter rate encoding 404) prior to scaling other types of content (e.g., audio), but thereafter to scale the audio content to a particular level before further scaling video content. As examples of how scaling component 110 can make such inferences or determinations, scaling order can be based upon a content type priority (e.g., predetermined list of content types with priority rankings) or based upon a content type proportion (e.g., the proportion of network traffic 104 that is represented by a particular type of content).

It should be readily appreciated that the disclosed subject matter can be conveniently and/or seamlessly integrated into existing communications network infrastructure. For example, by leveraging existing upstream or downstream fault management elements, thereby, e.g., flagging scaling events through SS7 or C7 (common signaling system number 7 protocols employed in connection with public switched telephone network (PSTN), possibly in connection with voice-over-IP (VOIP)). Such can effect changes on VOIP residential gateways or DSL access multiplexer (DSLAM) as well as wireless GPRS (general packet radio services), EDGE (enhanced data rates for GSM (global system for mobile communication) evolution), or AMR (adaptive multi-rate) audio codec base stations.

Moreover, the disclosed subject matter can apply to substantially any wireless generation standard, such as 2G (GSM or 1xRTT), 3G (UMTS or EV-DO), 3.5G (HSPA) as well as 4G (LTE, which combines GSM and CDMA). In addition, WIMAX can be supported as well, such as IEEE 802.16x. As 4G LTE (long term evolution) replaces earlier standards among communications network providers, video calls or video text messages will become a reality, which various modulation schemes such as quadrature amplitude modulation (QAM) and applications of various turbo codes are intended to handle to some degree. Likewise, in areas in which 16 QAM or 64 QAM has difficulty penetrating walls or existing physical structures, femtocells can be employed to extend coverage, e.g., by merging home or business DSL connectivity with wireless support. Regardless, the widespread appearance of video phones or the like will likely create bottlenecks in both domains (e.g., both wireless and IP domains) of connectivity, which can be alleviated by employing the disclosed subject matter.

Presently, many communications network providers concerned with DSL upstream bottlenecks are converting from IP security (IPsec) to secure real time transport protocol (SRTP). However, regardless of the protocol chosen, the disclosed subject matter can provide additional bandwidth or error correction opportunities independent of the underlying protocols, and therefore increase the efficiency or feature set of existing network providers.

In more detail with regard to scaling, in one or more aspect, scaling component 110 can apply a lesser codec to content 112 in order to reduce the resolution and therefore effect the scaling of resolution. In particular, scaling component 110 can apply the lesser codec according to standardized codecs associated with at least one of audio or video. For example, while potentially any suitable codec/modulation can be employed, scaling component 110 will typically select the lesser codec based upon the existing codec (e.g., the same format, but of lower bit rate), which are generally standardized codecs. For example, for wireless voice, a common scheme is AMR audio codecs, which typically has about eight standard bitrates between 12.2 Kbps and 4.75 Kbps. Likewise, while AMR audio codecs are generally used with wireless voice content, VOIP codecs such as G.711, G.726, G.728 and so on are generally employed in connection with VOIP audio. Similarly, video content often employs H.263, H264, MPEG-4, VC1 or the like, any of which can be suitable in connection with the disclosed subject matter. Tables I.-V. below provide reference to certain VOIP audio codecs and various video codecs that can be leveraged by the disclosed subject matter.

TABLE I

H.323 Gateways

| Codec Information | | Bandwidth Calculations |
|---|---|---|
| Codec | Bit Rate | Ethernet Bandwidth |
| G.711 | 64 Kbps | 87.2 Kbps |
| G.726 | 32 Kbps | 55.2 Kbps |
| G.726 | 24 Kbps | 47.2 Kbps |
| G.728 | 16 Kbps | 31.5 Kbps |
| G.729 | 8 Kbps | 31.2 Kbps |
| G.723.1 | 6.3 Kbps | 21.9 Kbps |
| G.723.1 | 5.3 Kbps | 20.8 Kbps |

TABLE II

Voice Bandwidth Savings

| Algorithm | Voice | Bandwidth Calculations | | |
|---|---|---|---|---|
| Codec | Paths | Eth BW | Scale Down | From G.711 |
| G.711 | 4 | 348.8 | NA | NA |
| G.726 | 4 | 220.8 | −128 | 128 |
| G.726 | 4 | 188.8 | −32 | 160 |
| G.728 | 4 | 126 | −62.8 | 222.8 |
| G.729 | 4 | 124.8 | −1.2 | 224 |
| G.723.1 | 4 | 87.6 | −37.2 | 261.2 |
| G.723.1 | 4 | 83.2 | −4.4 | 265.6 |

TABLE III

Video Scales Across Different Formats

| Codec Information | | Bandwidth Calculations | |
|---|---|---|---|
| H263 | SQCIF | QCIF | CIF |
| Low Quality | 33 Kbps | 64 Kbps | 64 Kbps |
| Standard | 33 Kbps | 128 Kbps | 128 Kbps |
| High Quality | 33 Kbps | 128 Kbps | 128 Kbps |
| MPEG 4 | SQCIF | QCIF | CIF |
| Low Quality | 64 Kbps | 64 Kbps | 64 Kbps |
| Standard | 64 Kbps | 75 Kbps | 128 Kbps |
| High Quality | 64 Kbps | 75 Kbps | 360 Kbps |

TABLE IV

| CIF to QCIF Bandwidth Range | |
|---|---|
| QCIF | 64 Kbps-128 Kbps |
| SQCIF | 33 Kbps-64 Kbps |
| CIF | 64 Kbps-360 Kbps |

TABLE V

| Video Conference | |
|---|---|
| Call Bandwidth | Quality |
| 110-250 Kbps | lower quality |
| 384-500 Kbps | average quality |
| 768-1000 Kbps | high quality |

Of course, as noted above, it should be underscored yet again that other codecs in addition to those presented here can be suitable for scaling, and can be selected for particular types of content and/or for certain efficiency related thereto.

Figure 5:
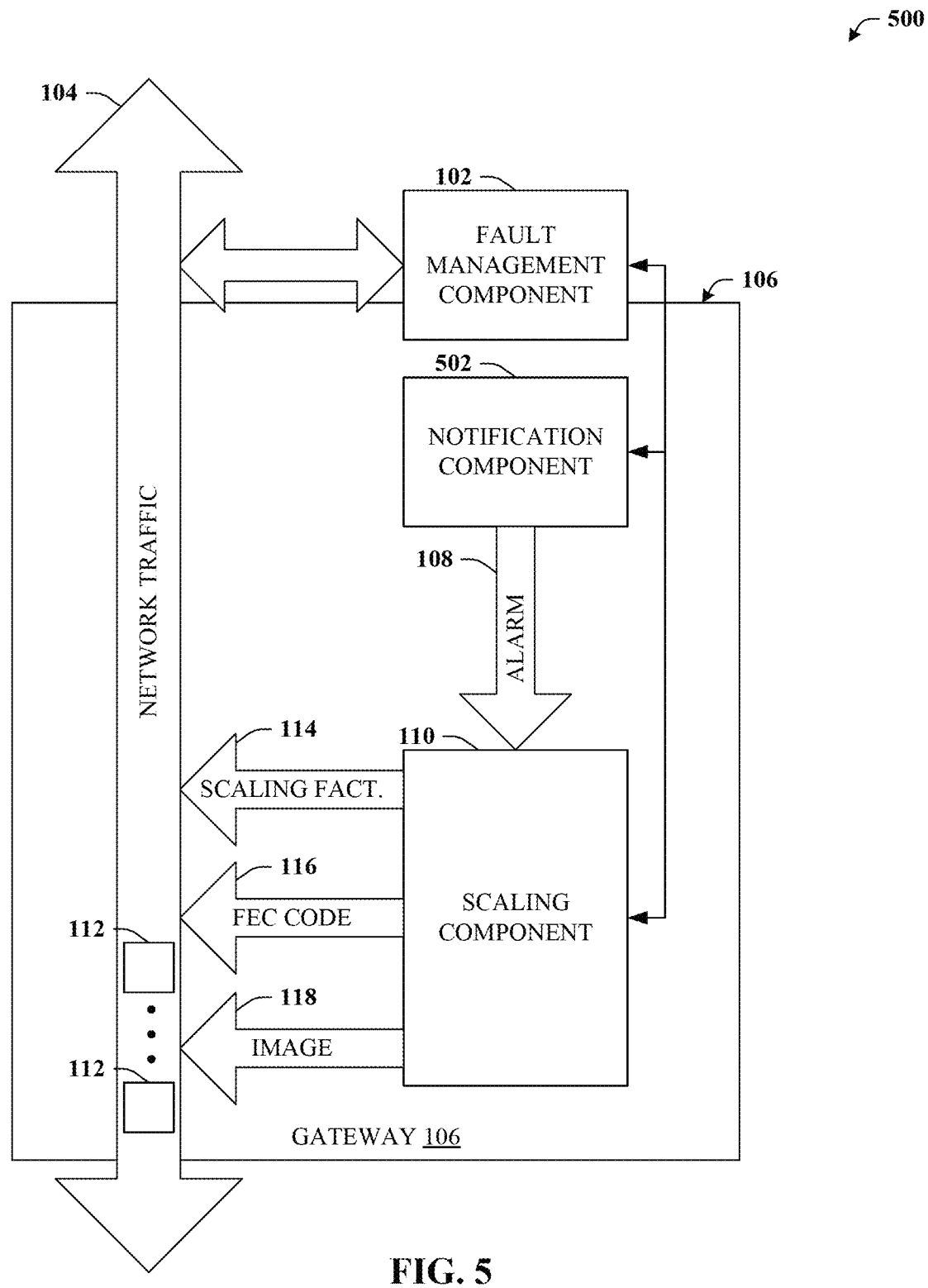
FIG. 5 depicts a block diagram of a system with an integrated scaling component that can scale content resolution to mitigate errors in a provisioned service of a communication network.

With reference now to FIG. 5, system 500 with an integrated scaling component that can scale content resolution to mitigate errors in a provisioned service of a communication network is provided. System 500 can include fault management component 102 and scaling component 110 as substantially described in connection with FIG. 1. Hence, fault management component 102 can monitor network traffic 104 through gateway 106 and can further issue alarm 108. Scaling component 110 can receive alarm 108 and apply scaling factor 114 to content 112 included in network traffic 104. In addition, scaling component 110 can, when determined appropriate, insert FEC code 116 or substitute content 112 with a preselected image 118.

One distinction here relative to FIG. 1, is that scaling component 110 is expressly depicted as being embedded or included in gateway 106. Likewise, as depicted based upon an overlap of the block elements, all or portions of fault management component 102 can also be embedded or included in gateway 106, but can as well reside elsewhere and be operatively or communicatively coupled thereto. Conventional communications network architectures are likely to maintain a disparate fault management element. Accordingly, in those cases, the disclosed subject matter can be more readily integrated with these existing architectures by leveraging an existing disparate fault management element to serve as a basis for or portion of fault management component 102, which would then likely be remote from gateway 106, at least in part. In those cases, fault management component 102 can transmit alarm 108 to notification component 502, which can then serve a portion of the role previously described with reference to fault management component 102 (e.g., forward alarm 108 to scaling component 110, as depicted).

Figure 6:
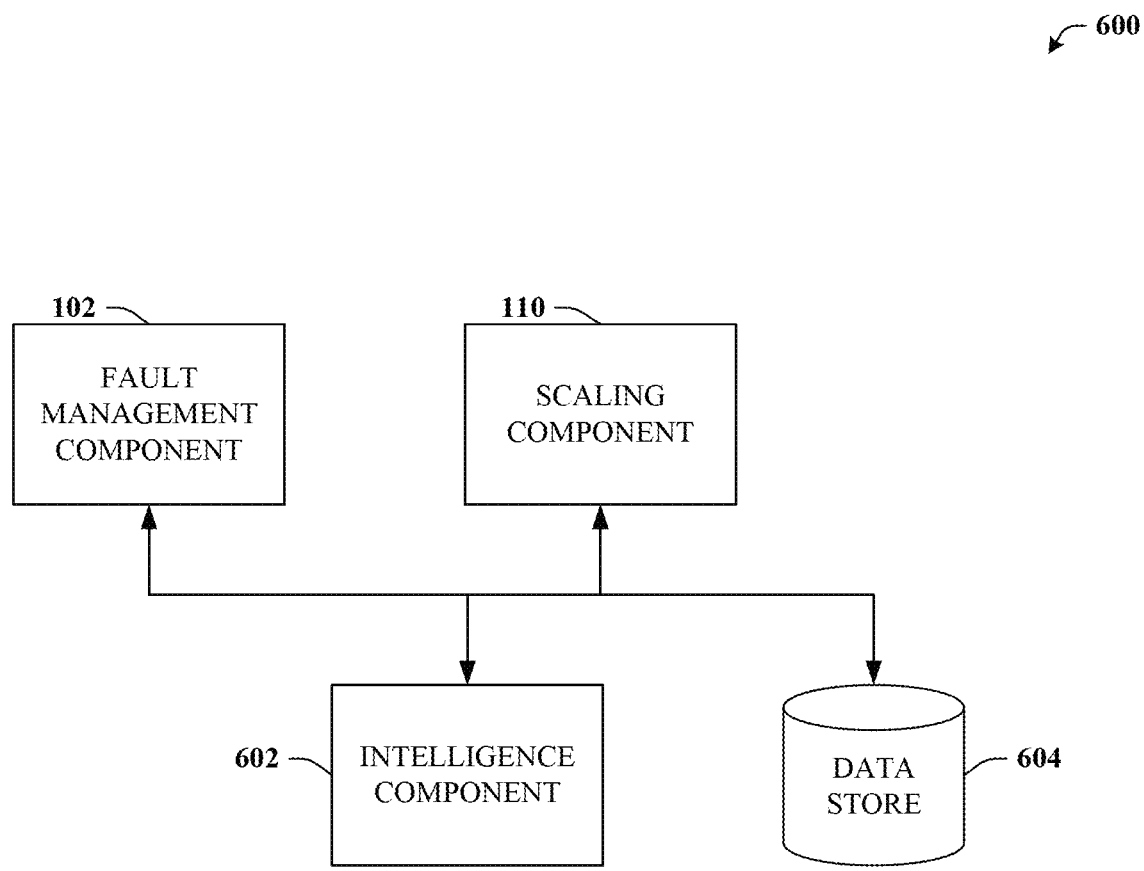
FIG. 6 illustrates a block diagram of a system that can perform or aid with various determinations or inferences.

Now turning to FIG. 6, system 600 that can perform or aid with various determinations or inferences is illustrated. Generally, system 600 can include fault management component 102 and scaling component 110 as substantially described herein. In addition to what has been described, the above-mentioned components can make intelligent determinations or inferences. For example, Bayesian probabilities or confidence measures can be employed or inferences can be based upon machine learning techniques related to historical analysis, feedback, and/or previous determinations or inferences.

For instance, fault management component 102 can intelligently determine or infer an impending or likely fault condition, possibly prior to network traffic 104 exhibiting characteristics that violate certain predetermined thresholds. For example, such inferences or determinations can be made based upon historical usage patterns based upon time of day, day of the week, or early detection or forecasting of incoming or outgoing network traffic 104 (e.g., loading an application that generally contributes significantly to network traffic 104, etc.). In addition, scaling component 110 can intelligently determine or infer an optimal scaling factor 114, e.g., optimized to very particular bandwidth utilizations and FEC code 116 insertions to obtain maximal throughput for a given provision of service. As another example, scaling component 110 can intelligently determine or infer the scaling order in a similar manner (e.g., scale video first, but only to a certain level, then voice, but only to a particular level, then back to video).

In addition, system 600 can also include intelligence component 602 that can provide for or aid in various inferences or determinations. In particular, in accordance with or in addition to what has been described supra with respect to intelligent determinations or inferences provided by various components described herein, e.g., all or portions of fault management component 102 and scaling component 110. Additionally or alternatively, all or portions of intelligence component 602 can be included in one or more components described herein. Thus, intelligence component 602 can reside in whole or in part either within systems 100 or 500 or within suitable network components related thereto, depending upon various implementation details.

Moreover, intelligence component 602 will typically have access to all or portions of data sets described herein, such as data store 604. As used herein, data store 604 is intended to be a repository of all or portions of data, data sets, or information described herein or otherwise suitable for use with the described subject matter (e.g., user profiles, service agreements, history, network traffic 104 data either current or historical, codec versions, etc.). Data store 604 can be centralized, either remotely or locally cached, or distributed, potentially across multiple devices and/or schemas. Furthermore, data store 604 can be embodied as substantially any type of memory, including but not limited to volatile or non-volatile, sequential access, structured access, or random access and so on. It should be understood that all or portions of data store 604 can be included in systems 100 or 500, or can reside in part or entirely remotely from systems 100 or 500.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
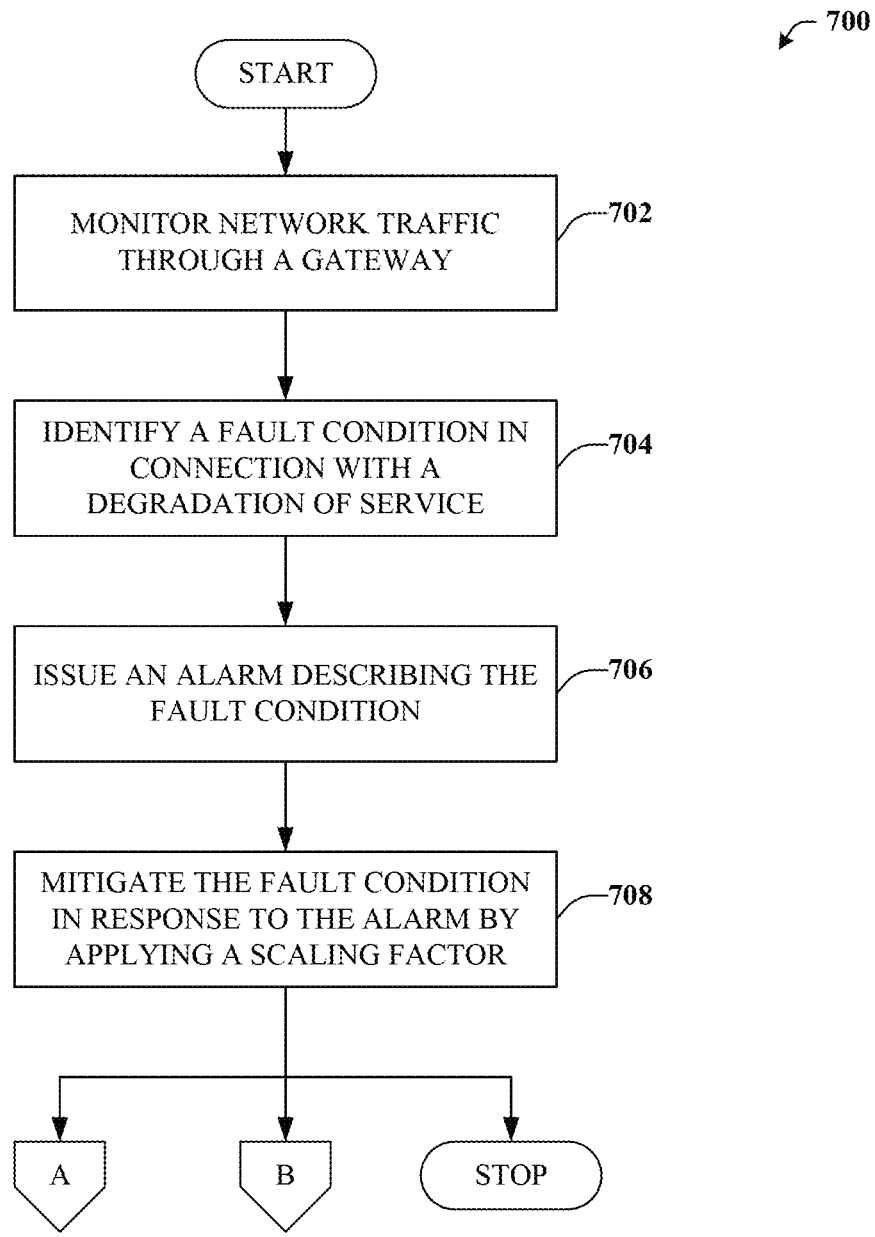
FIG. 7 is an exemplary flow chart of procedures that define a method for alleviating errors in a provisioned service of a communication network by scaling content resolution.
Figure 8:
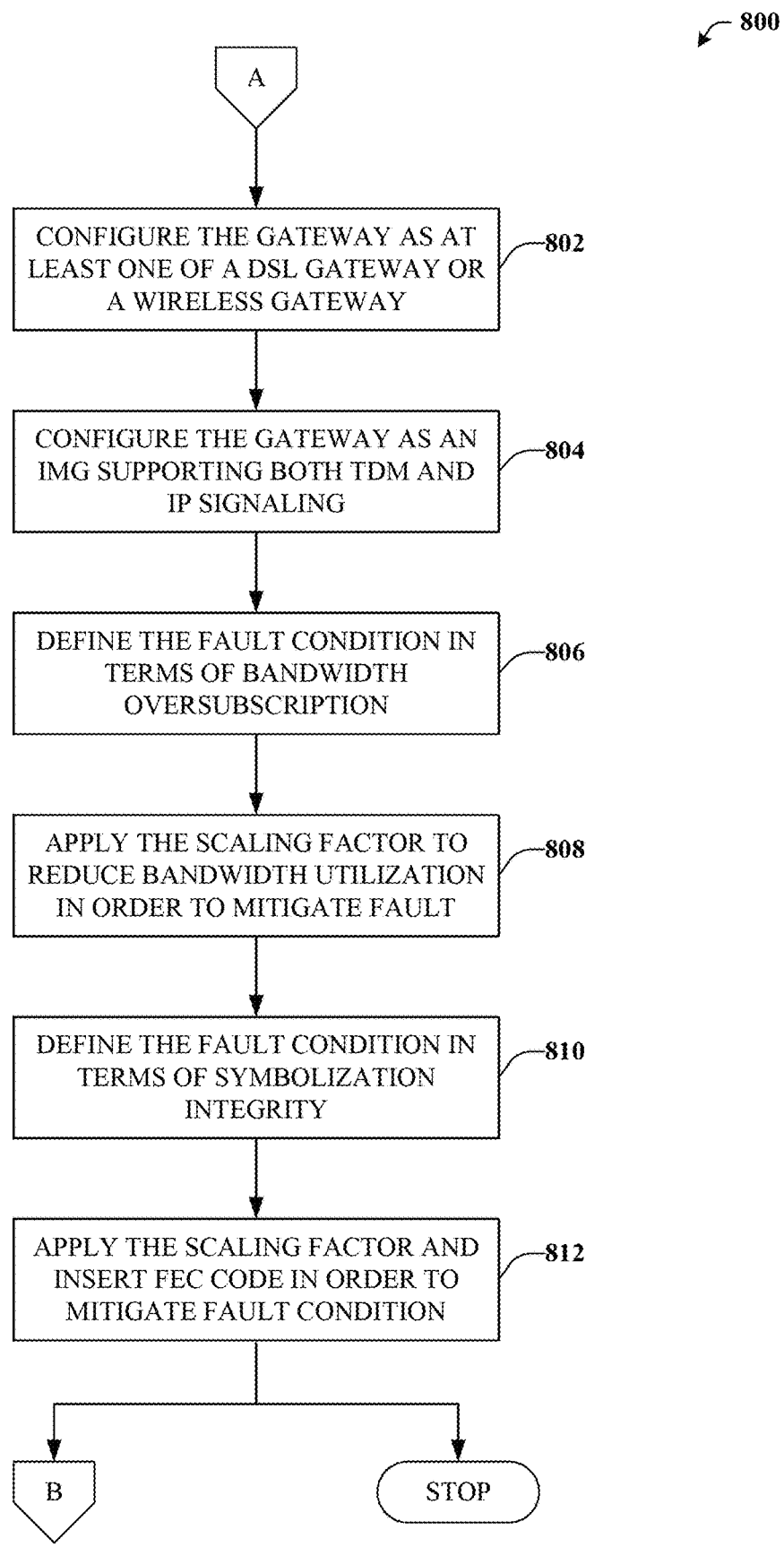
FIG. 8 depicts an exemplary flow chart of procedures defining a method for configuring suitable gateways and/or defining fault conditions in connection with scaling factors.
Figure 9:
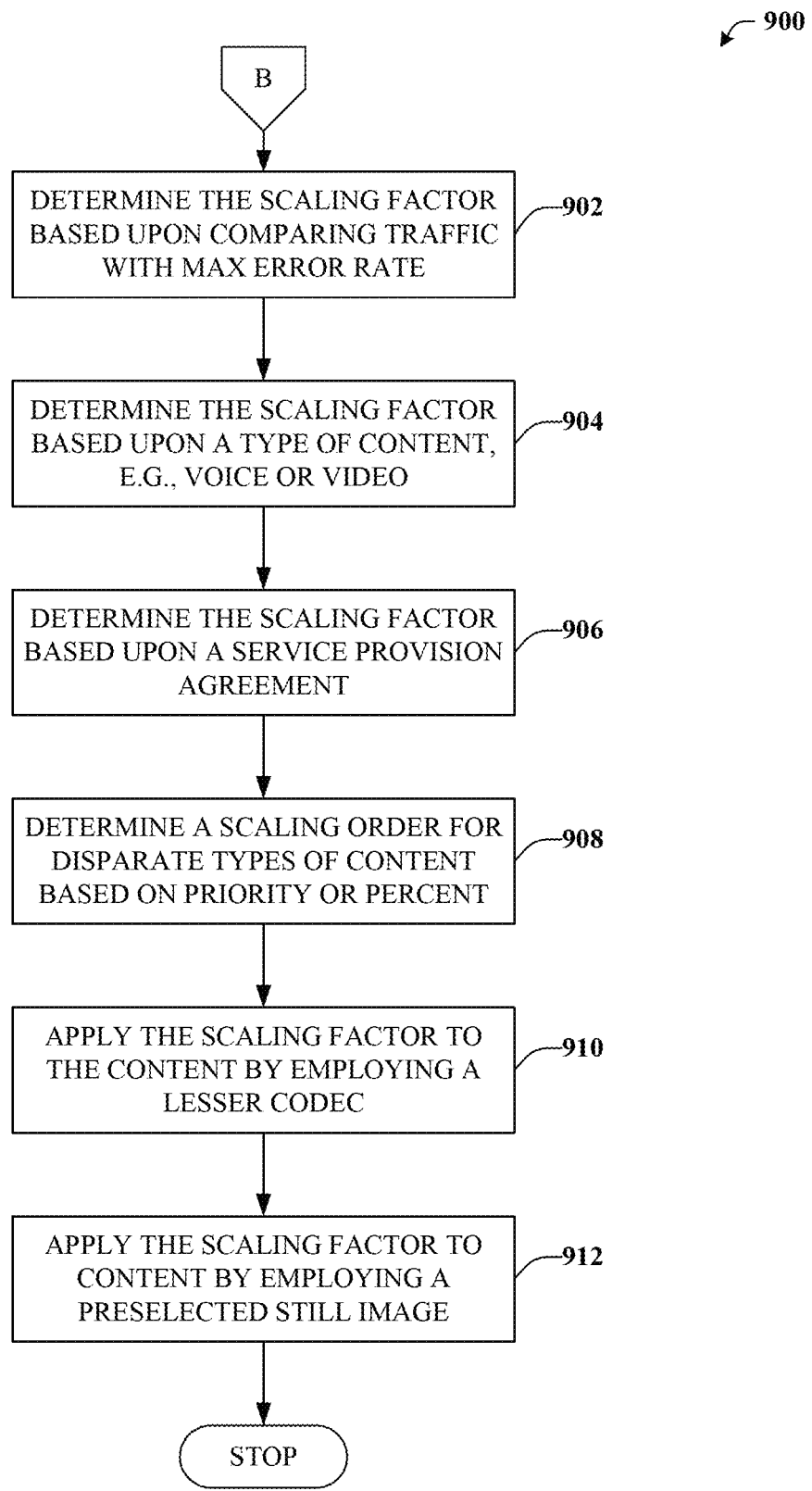
FIG. 9 provides an exemplary flow chart of procedures defining a method for providing addition features or aspects in connection with alleviating errors in a provisioned service of a communication network by scaling content resolution.

FIGS. 7-9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, exemplary method 700 for alleviating errors in a provisioned service of a communication network by scaling content resolution is depicted. Generally, at reference numeral 702, network traffic through a gateway can be monitored. Based upon such monitoring, at reference numeral 704, a fault condition in connection with a degradation of service can be identified. For example, the fault condition can relate to bandwidth oversubscription, to symbolization integrity (e.g., logical errors in data representation), or the like.

Regardless, at reference numeral 706, an alarm describing the fault condition can be issued. Thus, the alarm can include indicia relating to the type and nature of the fault condition, as well as to a potential severity of the fault condition or data types (e.g., encoding formats) that are presently contributing most to the fault condition. Accordingly, at reference numeral 708, the fault condition can be mitigated in response to the alarm by applying a scaling factor for transforming a presentation resolution (e.g., a resolution at which the underlying media/content will be presented) associated with content transitioning the gateway.

Turning now to FIG. 8, exemplary method 800 for configuring suitable gateways and/or defining fault conditions in connection with scaling factors is illustrated. For example, at reference numeral 802, the gateway detailed in connection with reference numeral 702 of FIG. 7 can be configured as at least one of a DSL gateway or a wireless gateway. Hence, network traffic resulting from conventional wireless communications platforms (e.g., propagated by way of base stations) or conventional DSL platforms (e.g., propagated by way of femtocells) can be subject to the transformations or other features detailed herein. Likewise, at reference numeral 804, the gateway can be configured as an integrated media gateway supporting both TDM protocol signaling and IP signaling, which can singularly serve both wireless base stations and femtocells.

At reference numeral 806, the fault condition (e.g., identified at reference numeral 704 of FIG. 7) can be defined in terms of bandwidth oversubscription. In such cases, at reference numeral 808, the scaling factor (applied in connection with reference numeral 708) can be applied to reduce bandwidth utilization of content transitioning the gateway in order to mitigate the fault condition in terms of bandwidth oversubscription.

Similarly, at reference numeral 810, the fault condition can be applied in terms of symbolization integrity. Accordingly, at reference numeral 812, the scaling factor can be applied to reduce an amount of data transitioning the gateway and replacing all or a portion of that amount of data with FEC code in order to mitigate the fault condition in terms of symbolization integrity.

Now regarding FIG. 9, exemplary method 900 for providing addition features or aspects in connection with alleviating errors in a provisioned service of a communication network by scaling content resolution is provided. At reference numeral 902, the scaling factor can be determined based upon comparing current network traffic to at least one of a predetermined maximum bandwidth allocation or to a predetermined maximum error rate threshold. Appreciably, in the first case the scaling factor can be employed to mitigate bandwidth oversubscription fault conditions, whereas in the second case, the scaling factor can be employed to mitigate symbolization integrity fault conditions.

Next to be described, at reference numeral 904, the scaling factor can be determined based upon a type of content transitioning the gateway, wherein the type of content is at least one of voice or video. Appreciably, the type of content can also be more particularly distinguished (e.g., over broad classifications such as voice and video) based upon a type of encoding format employed for the content. Additionally or alternatively, at reference numeral 906, the scaling factor can be determined based upon a service provision agreement. For example, higher order service agreements might provide higher quality usage, and therefore can be scaled at smaller intervals or from a higher resolution starting point. On the other hand, lower order service agreements might scale at greater intervals or begin at resolutions that might otherwise result from scaling of content for higher order service agreements.

In one or more aspect, at reference numeral 908, a scaling order (e.g., a content order or target level of scaling to apply to various types of content) for disparate types of content transitioning the gateway can be determined based upon at least one of a content type priority or a content type proportion. Thus, e.g., voice can be defined to take priority over video or the scaling order of various types of content can be defined based upon a detected proportion of each type of content transitioning the gateway (e.g., to determine relative effect of the scaling in terms of overall network traffic).

It should be appreciated that regardless of the manner or mechanisms employed to determine a scaling factor, the application of the scaling factor can be performed in an independent manner. For example, at reference numeral 910, the scaling factor can be applied to the presentation resolution by employing a lesser codec (e.g., a codec, potentially of the same encoding format, but with a lesser/lower bitrate) for a transformation of content transitioning the gateway. At reference numeral 912, the scaling factor can be applied to the presentation resolution by employing a preselected still image for representing video-based content.

Figure 10:
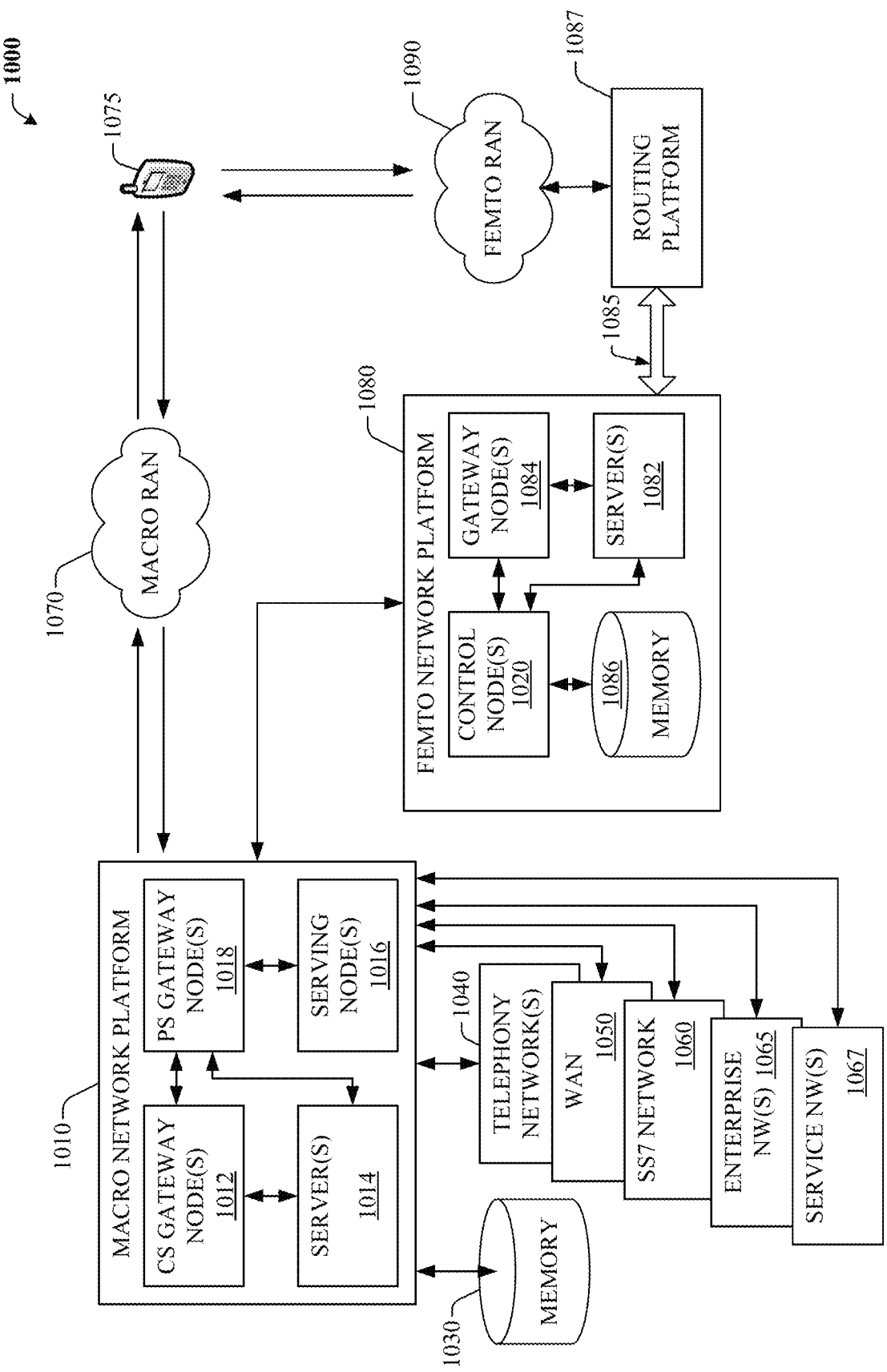
FIG. 10 illustrates an example wireless communication environment with associated components that can enable operation of an enterprise network in accordance with aspects described herein.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 4G, 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090, linked to the femto network platform 1080 through a routing platform 102 via backhaul pipe(s) 1085, wherein backhaul pipe(s) are substantially the same a backhaul link 1153 below. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration (e.g., devices served through femto RAN 1090; access control lists, or white lists); service policies and specifications; privacy policies; add-on features; and so forth.

It is noted that femto network platform 1080 and macro network platform 1010 can be functionally connected through one or more reference link(s) or reference interface(s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
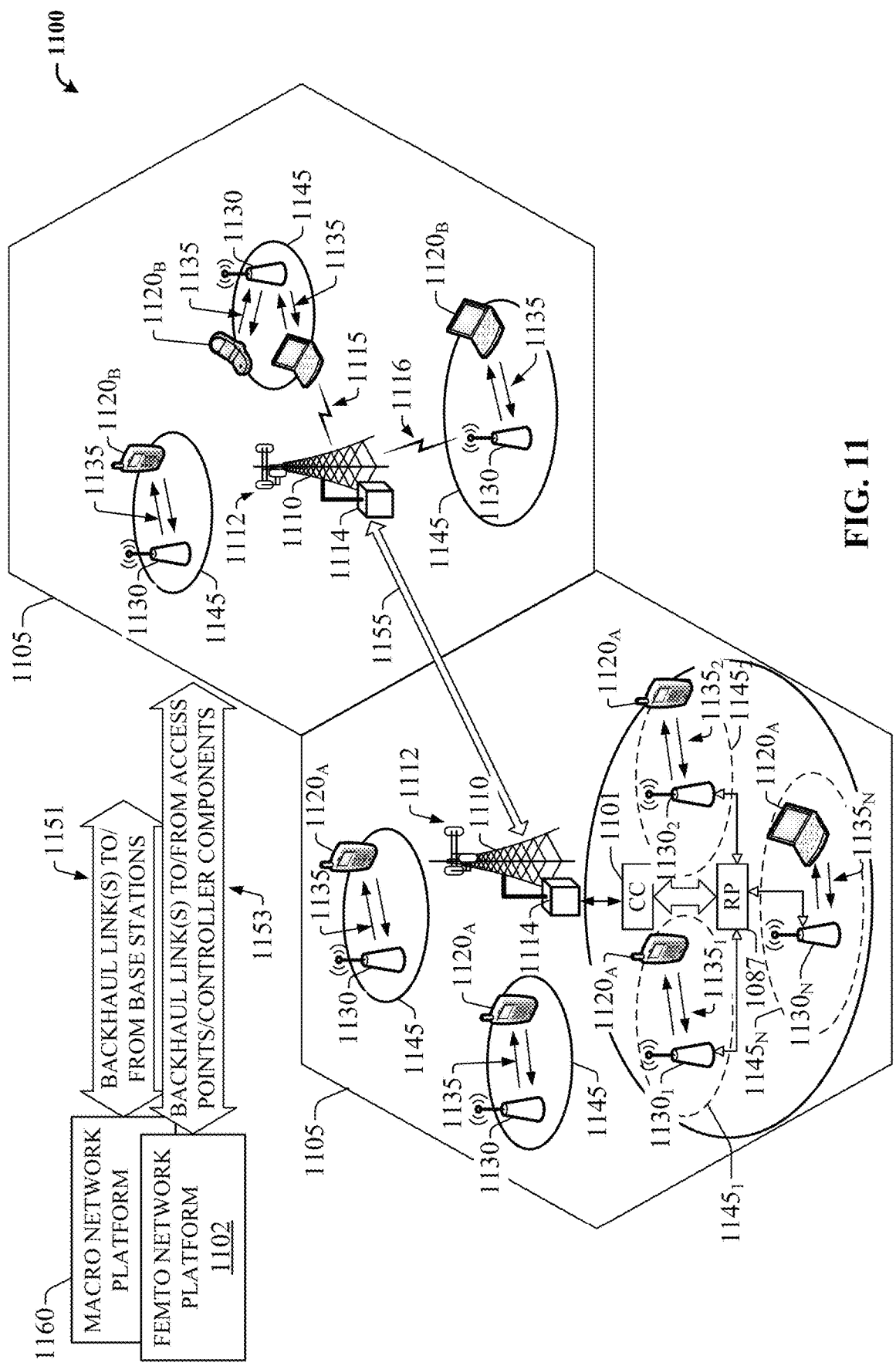
FIG. 11 illustrates a schematic deployment of a macro cell for wireless coverage in accordance with aspects of the subject specification.

FIG. 11 illustrates a wireless environment that includes macro cells and femtocells for wireless coverage in accordance with aspects described herein. In wireless environment 1150, two areas 1105 represent "macro" cell coverage; each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE 1120$_A$, 1120$_B$, in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE 1120$_A$, 1120$_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112 (e.g., smart antennas, microwave antennas, satellite dish(es) . . . ) that can serve one or more sectors within a macro cell 1105. It is noted that a set of radio network control node(s), which can be a part of macro network platform; a set of base stations (e.g., Node B 1110) that serve a set of macro cells 1105; electronics, circuitry or components associated with the base stations in the set of base stations; a set of respective OTA wireless links (e.g., links 1115 or 1116) operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP) 1087, which in turn can be connect to a controller component (CC) 1101. Typically, the information from UEs 1120$_A$ can be routed by the RP 102, for example, internally, to another UE 1120$_A$ connected to a disparate femto AP connected to the RP 1087, or, externally, to the femto network platform 1102 via the CC 1101, as discussed in detail supra.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $10^4$-$10^7$ femto APs 1130 per base station 1110. According to an aspect, a set of femto access points 1130$_1$-3730$_N$, with N a natural number, can be functionally connected to a routing platform 1087, which can be functionally coupled to a controller component 1101. The controller component 1101 can be operationally linked to the femto network platform 330 by employing backhaul link(s) 1153. Accordingly, UEs UE 3720$_A$ connected to femto APs 1130$_1$-1130$_N$ can communicate internally within the femto enterprise via the routing platform (RP) 1087 and/or can also communicate with the femto network platform 1102 via the RP 1087, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 12:
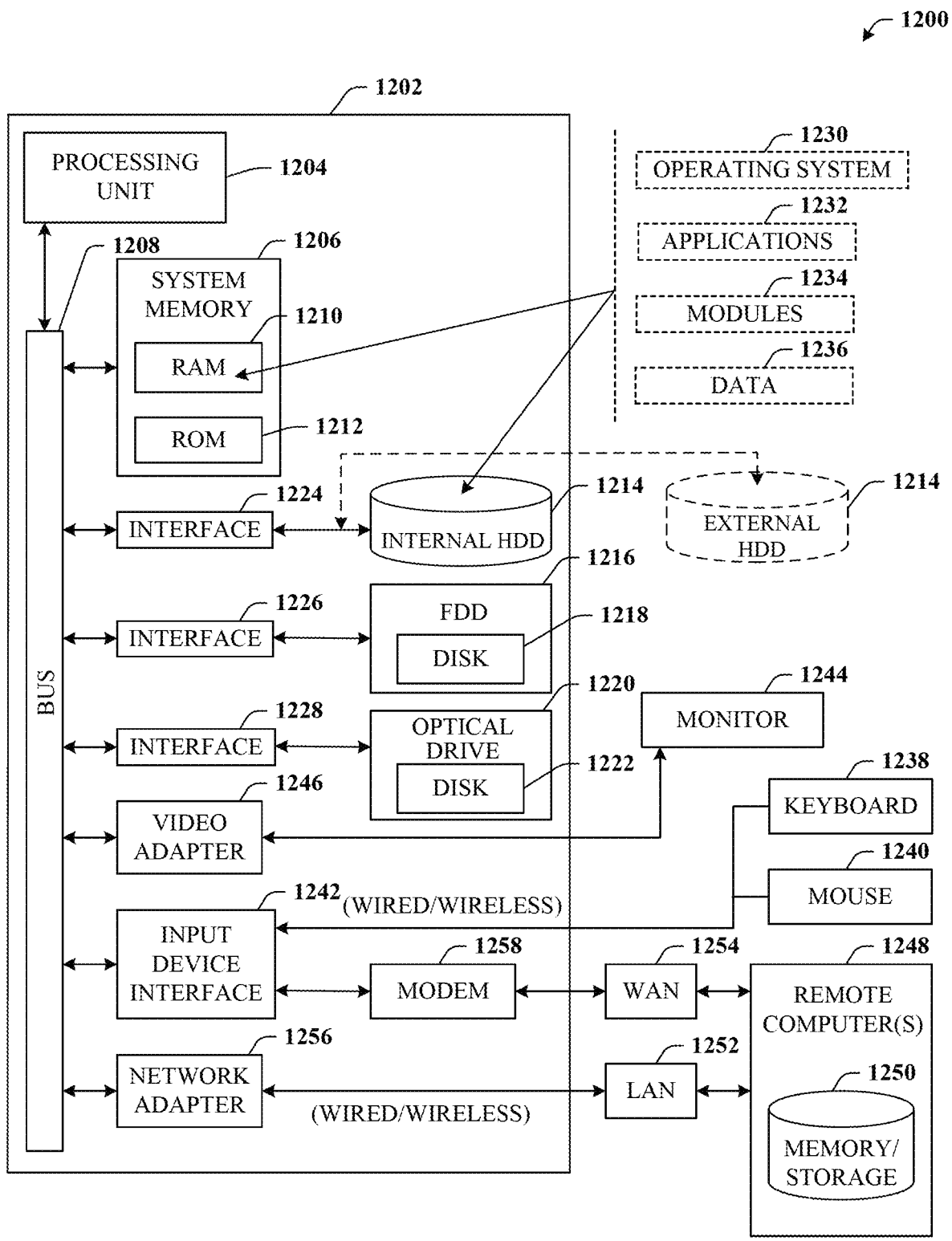
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the terms "system," "component," "interface," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile station," "mobile," subscriber station," "access terminal," "terminal," "handset," and similar terminology, generally refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell," "cell site," and the like, are utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A gateway device, comprising:
a processor; and
a memory that stores executable instructions that, when executed by the processor, facilitate performance of operations, comprising:
determining that a state of network traffic being communicated via the gateway device has changed from a first state to a second state;
determining that a portion of the network traffic being communicated via the gateway device comprises content, received by the gateway device, that is encoded according to a first encoding format;
utilizing the first encoding format to decode the content, resulting in decoded content;
utilizing a second encoding format, different than the first encoding format, to encode the decoded content, resulting in encoded content; and
transmitting the encoded content that is encoded according to the second encoding format.

2. The gateway device of claim 1, wherein the first encoding format is representative of a first codec and the second encoding format is representative of a second codec that differs from the first codec.

3. The gateway device of claim 1, wherein the first encoding format is representative of a codec having a first encoding bit rate and the second encoding format is representative of the codec having a second encoding bit rate that differs from the first encoding bit rate.

4. The gateway device of claim 1, wherein the operations further comprise selecting the second encoding format based on the state of the network traffic.

5. The gateway device of claim 1, wherein the operations further comprise selecting the second encoding format based on a type of the content.

6. The gateway device of claim 1, wherein the first state is determined to be a congested state in which a fault condition was determined to exist with respect to the network traffic being communicated via the gateway device, and the second state is determined to be an uncongested state in which the fault condition was determined to not exist.

7. The gateway device of claim 6, wherein the operations further comprise selecting the second encoding format based on a condition that the second encoding format increases a quality of the content communicated via the gateway device.

8. The gateway device of claim 1, wherein the first state is determined to be an uncongested state in which a fault condition was determined not to exist with respect to the network traffic being communicated via the gateway device, and the second state is determined to be a congested state in which the fault condition was determined to exist.

9. The gateway device of claim 8, wherein the operations further comprise selecting the second encoding format based on a condition that the second encoding format reduces a data size of the content communicated via the gateway device.

10. The gateway device of claim 8, wherein the fault condition is determined to exist in response to a bandwidth measure of the network traffic being communicated via the gateway being determined to exceed a defined bandwidth threshold.

11. The gateway device of claim 8, wherein the fault condition is determined to exist in response to a bit error rate of the network traffic being communicated via the gateway being determined to exceed a defined error rate threshold.

12. The gateway device of claim 11, wherein the operations further comprise updating an amount of forward error correction code of a packet of the content being communicated by the gateways device.

13. A non-transitory machine-readable medium, comprising executable instructions that, when executed by a processor, facilitate performance of operations, comprising, comprising:
determining that a state of network traffic being communicated via the gateway device has changed from a first state to a second state;
determining that a portion of the network traffic being communicated via the gateway device comprises content encoded according to a first encoding format;
utilizing the first encoding format to decode the content received by the gateway device, resulting in decoded content; and
transmitting re-encoded content, wherein the re-encoded content is generated in response to encoding the decoded content according a second encoding format, different than the first encoding format.

14. The non-transitory machine-readable medium of claim 13, wherein the first encoding format is representative of a first codec and the second encoding format is representative of a second codec that differs from the first codec.

15. The non-transitory machine-readable medium of claim 13, wherein the first encoding format is representative of a codec having a first encoding bit rate and the second encoding format is representative of the codec having a second encoding bit rate that differs from the first encoding bit rate.

16. The non-transitory machine-readable medium of claim 13, wherein the operations further comprise updating an amount of forward error correction code of a data packet of the content being communicated by the gateways device.

17. A method, comprising:
  determining, by a device comprising a processor, that a state of network traffic being communicated via the gateway device has changed from a first state to a second state;
  determining, by the device, that a portion of the network traffic being communicated via the gateway device comprises content encoded via a first codec;
  employing, by the device, the first codec to decode the content received by the gateway device, resulting in decoded content;
  employing, by the device, a second codec, different than the first codec, to encode the decoded content, resulting in encoded content; and
  communicating, by the device, the encoded content.

18. The method of claim 17, wherein the operations further comprise updating, by the device, an amount of forward error correction code of a data packet of the content being communicated by the gateways device.

19. The method of claim 17, wherein the operations further comprise selecting, by the device, the second codec based on the state of the network traffic.

20. The method of claim 17, wherein the operations further comprise selecting, by the device, the second codec based on a type of the content.

* * * * *